2,782,171

LEATHER LIQUID POLISH

Elliott Morrill and Lawrence Newburn, Indianapolis, Ind., assignors to The Best Foods, Inc., New York, N. Y., a corporation of New Jersey No Drawing. Application December 29, 1952, Serial No. 328,533

7 Claims. (Cl. 260—8)

The present invention relates to liquid polishes for shoes and leather goods.

Liquid polishes for shoes and leather goods have been on the market for many years and are manufactured and sold by a number of manufacturers for professional and home use. However, these polishes suffer from one or more disadvantages. Many of these polishes require that vigorous physical effort be expended to obtain a clear gloss or shine, while others are designed to dry to a bright finish on the leather surface, without vigorous rubbing, brushing or buffing, but the latter usually have little or no resistance to water. When the latter polishes are applied to shoes and the shoes worn in the rain or exposed to moisture, the color washes off easily. This is a serious defect and is bound to cause great inconvenience to the user.

Other liquid polishes have been proposed including those which are essentially lacquers in character. These polishes will produce a bright surface but have a "lacquered or painted" appearance which is unsatisfactory from the esthetic standpoint. But what is more, these polishes do not mask scuff marks or blemishes properly. They produce a hard impervious film which cannot be removed, without resort to the use of organic solvents which streak the surface of the leather and produce an unsightly appearance. Since the layers cannot conveniently be removed, by washing and other desirable means, repeated applications of polish produce a "build-up" which clogs the pores of the leather, and becomes thick enough to craze when flexed and produce a crackled finish. Also, many such polishes contain solvents which are dangerous to use because of their inflammability and toxicity. These compositions also fail to "nourish" the leather, i. e., help the leather retain its pliancy.

The liquid polishes according to the present invention impart a long-lasting, clear gloss or shine to shoes and leather goods without any polishing, rubbing, buffing or other mechanical treatment. The finish is tough but pliable. They spread easily and smoothly over even rough leather surfaces. Therefore, there is made available a product which permits the amateur to attain the same results, with a minimum of physical effort, which compares favorably with that produced by the professional. The polishes impart a highly water-repellent finish to leather and make the leather surface substantially waterproof. The degree of water repellency is so great that ordinary water alone will not remove the polish even with the aid of mechanical action, such as rubbing with a wet cloth. Thus, the polish will not rinse off when exposed to rain, etc. It is unique, however, that the polish may be removed simply and safely by means available in every home. Soap and water, or an aqueous solution of a mild alkali will remove the polish. It becomes possible to remove the polish and apply a polish of a different color and to prevent excessive build-up of polish due to repeated applications. These polishes are free of toxic and inflammable solvents.

It is an object of the present invention to provide a novel liquid polish which will impart a superior shine and finish to shoes and leather goods requiring no mechanical effort to produce these results.

It is an additional object of the invention to provide a liquid polish which when applied to shoes and leather goods will provide excellent water repellency but which may be easily washed from the leather.

It is also an object of the invention to provide a liquid polish which will mask scuff marks and blemishes on a leather surface.

Other objects will be apparent to those skilled in the art upon reading the specification which follows.

The novel liquid polish of the present invention comprises an alkaline aqueous dispersion of a polymerized synthetic thermoplastic resin, and an alkaline protein solution. Optionally, there may be incorporated waxes of vegetable, animal or mineral origin; coal-tar dyestuffs, and inorganic or organic pigments; preservatives; and surface active agents.

The mechanism through which the synthetic thermoplastic resin, alkali-soluble protein and optionally, the waxes and other materials cooperate to produce the unique properties of the polish is not entirely understood. However, the resin and protein are critical to the enhanced properties of the product. If one of these components is omitted, the resulting polish does not have the properties which are unique to the present invention.

The preferred compositions in accordance with the present invention may vary within broad limits insofar as the ingredients other than the thermoplastic synthetic resin and protein are concerned. The solids of the thermoplastic synthetic resin shall fall within 1 to 18% by weight of the product. The preferred range is from 1 to 7.5%. The protein shall desirably make up from 0.25 to 3.0% by weight of the product. Satisfactory results are often obtained with 3.5% of protein, although for practical results, 3.0% of protein is all that is necessary. The preferred quantity is 2.5%. It has been discovered that unless this quantitative relationship exists, the resulting polish will not have the desired properties which may be obtained by the invention.

The pH of the polish shall be adjusted within the limits of 7.5 to 10.5. The most suitable pH is 9.0. The pH may be adjusted to this alkaline range by the use of organic and inorganic water-soluble alkalies, such as: the alkali metal hydroxides, including ammonium hydroxide; borax, sodium carbonate, the alkanolamines, morpholine, etc.

The thermoplastic synthetic resin used in the liquid polish of the invention is incorporated in the form of an aqueous emulsion of the polymerized resin. The thermoplastic synthetic resins are a well known group of materials with which the chemist is familiar. These emulsions are prepared by emulsifying the monomer of the resin in water by the use of an anionic or non-ionic synthetic detergent. The anionic and non-ionic synthetic detergents are equally well known. The former group are the sulfuric acid derivatives of organic alcohols, acids and amides, such as sodium lauryl sulfate, sodium lauryl sulfoacetate, etc. Illustrative of the non-ionic group are the alkylated polyether alcohols, such as iso-octyl phenyl ether of polyethylene glycol having from 8 to 40 polyethylene groups, and preferably nearer to the upper limit. The pH is adjusted to a range of 6.0 to 12.0 after which the monomer or mixture of monomers in the emulsion are ready for polymerization. Polymerization may be produced by exposing the emulsion to light but more desirably by subjecting the emulsion to small amounts of an oxidizing catalyst, such as; the organic peroxides, including benzoyl peroxide, and the inorganic peroxides, including hydrogen peroxide and ammonium persulfate. It is important that polymerization be carried to completion. The resulting product is an aqueous emulsion of the polymerizate; the latter being in finely divided form. It is common to use those polymerized emulsions containing from 30 to 50%, and preferably 35 to 40%, by weight of polymerizate. Any remaining monomer may be removed by steam distillation.

The preferred polymerizates are those produced as polymers or copolymers of the acrylic resins, including acrylic and methacrylic acid esters, and the vinyl resins, including vinyl chloride and vinyl acetate. Examples of the acrylic and methacrylic acid ester resins are: methyl methacrylate, butyl methacrylate, ethyl-methyl-methacrylate, methyl acrylate, etc. Particularly advantageous copolymers are those of methyl methacrylate and butyl methacrylate or of methyl methacrylate and vinyl acetate. The acrylic acid and substituted acrylic acid ester resins give best results.

The alkali soluble protein to be used is one which is soluble in water at a pH of 7.5 to 10.5. Due to the high molecular weight of the protein, the solution formed is usually of a colloidal nature as distinguished from the true solutions which are obtained from crystalloid substances. The protein may be derived from any source either animal or vegetable. For example, in addition to meat sources, one may use milk protein (casein) and the proteins found in vegetable material, such as seed cakes of soya beans, corn and cotton, etc. Soya beans are a very economical and satisfactory source of protein, as is casein precipitated from milk.

One method of preparing the protein from soya beans is to first extract the beans with hexane to remove the oil and most of the fat. The remainder of the bean comprises about 45% protein. This protein is extracted with a dilute alkaline aqueous solution and filtered. The filtrate contains the protein. The filtrate is acidified to precipitate the protein as a curd, which is then washed, dried and ground to a free flowing powder. It is practically entirely protein. On a dry basis the product will comprise over 90% protein and frequently 95 to 98% protein. The remainder of the composition is in the range of 1–2% ash, up to 10% moisture and 1–2% of carbohydrate-protein complex.

The protein as prepared above may be used in the preparation of the products of the invention without further treatment, or the protein may be subjected to a mild degradation treatment by mild heating in a dilute alkaline aqueous solution. Proteins as they occur in nature usually have a high molecular weight with the upper limit in the order of 200,000. It is contemplated that the alkaline degradation may be effected, if desired, until the molecular weight shall not be lower than 16,000. It is desirable that the molecular weight range shall be between 48,000 and 200,000, and preferably between 60,000 and 200,000. Excellent results have been obtained with protein having molecular weights of 60,000; 100,000; and 200,000.

The protein used should also be free of heat coagulable material. That is, when a dilute (3.0%) alkaline solution of the protein is heated to the boiling point, or at a slightly lower temperature, for a period of up to 1 hour, the solution should remain stable. The protein as prepared above is substantially devoid of heat coagulable materials. Also, when the protein is dissolved in an aqueous solution of pH 7.5 to 10.5 to the extent of 3.0% by weight, the viscosity should not exceed 150 centipoises at 20° C. One highly desirable protein material in such a solution has a viscosity of 1.89 centipoises at 20° C.

In spite of the complexity of the protein molecule, the term "protein" has a well-defined meaning in the chemical art as shown in Hackh's Chemical Dictionary, second edition, 1937, page 758.

Waxes may be used in the polishes of the invention when desired. These waxes may be of animal, vegetable and mineral (petroleum) origin. Such waxes are carnauba, ouricury, candelilla, montan, sugar-cane, beeswax and paraffin waxes. These wax solids may comprise up to 12% by weight of the composition. Where montan wax is used, the preferred concentration is 5% and where carnauba wax is used, 9% by weight of the composition is most desirable. The waxes are normally incorporated into the liquid polishes as an aqueous emulsion. The waxes may be emulsified with a number of emulsifying agents.

Since it is desirable to have a staining material in the liquid polish, we prefer to incorporate a coal-tar dyestuff, or an inorganic or organic pigment to impart color to the leather. Additionally, preservatives and surface active agents are desirably added to the composition. It is contemplated that the staining materials may comprise up to 1.5% by weight of the liquid polish.

The present invention also comprises a novel process for preparing the liquid polishes of the invention. In the process, the protein, which is available commercially as a free-flowing powder, is added to about ten times its weight of water by sprinkling the powder into the water, with stirring, to form a slurry. Enough alkali to adjust the pH of the final product to between 7.5 and 10.5 is then added. If the alkali is a solid, a concentrated aqueous solution must be prepared first. The resulting mixture is stirred and heated to 70°–75° C. for about 30 minutes. The mixture is cooled to room temperature and the aqueous emulsion of the polymerized thermoplastic synthetic resin is added with stirring. Should it be desirable to incorporate a wax into the product, an aqueous emulsion of the wax is also mixed into the composition at this stage. To the resulting product is added sufficient water to make up the desired weight or volume. To the final solution may be added solubilized or slurried preservatives, dyes, or pigments, etc. Optionally, the dyes may be incorporated into the waxes when they are being melted to form the wax emulsion prior to being incorporated into the liquid polish.

In order more clearly to disclose the nature of the present invention, specific examples illustrating the preparation of typical compounds will hereinafter be described. It should be understood, however, that this is done solely by way of example and is intended neither to delineate the scope of the invention nor limit the ambit of the appended claims. The method of preparation used in the examples which follow is that described above.

*Example 1*

| | Percent |
|---|---|
| Soya bean protein (having molecular weight of 200,000) | 0.250 |
| Aqueous emulsion of polymerized butyl methacrylate resin (of 35% solids content) | [1] 1.000 |
| Sodium hydroxide flakes | 0.100 |
| Aqueous wax emulsion | 13.770 |
| Preservative mixture | 0.850 |
| Spirit soluble Nigrosine SSB (colour index 864) | 1.000 |
| Chrysodine Y base (colour index 20) | 0.075 |
| Water | 82.955 |
| | 100.000 |

[1] Based upon solids.

*Example 2*

| | Percent |
|---|---|
| Soya bean protein (having molecular weight of 100,000) | 2.500 |
| Aqueous emulsion of polymerized butyl methacrylate resin (of 35% solids content) | [1] 7.500 |
| Ammonium hydroxide | 0.250 |
| Aqueous wax emulsion | 0.850 |
| Metanil Yellow (colour index 138) | 0.001 |
| Acid brown dye | 0.005 |
| Soap solution | [1] 0.160 |
| Water | 88.7385 |
| | 100.0000 |

[1] Based upon solids.

Some consumers prefer a liquid polish containing no dye or pigment. The following is such a product.

Example 3

| | Percent |
|---|---|
| Soya bean protein (having molecular weight of 100,000) | 3.00 |
| Aqueous emulsion of polymerized butyl methacrylate resin (of 35% solids content) | ¹ 18.00 |
| Ammonium hydroxide | 0.25 |
| Aqueous wax emulsion | 0.85 |
| Water | 77.90 |
| | 100.00 |

¹ Based upon solids.

In the above examples, the preservative mixture is one which has been found to be advantageous in the liquid polishes of the invention and has the following composition.

| | Percent |
|---|---|
| Sodium ortho-phenyl phenate | 0.2 |
| Ortho-benzyl-para-chloro-phenol | 0.2 |
| 1,3,5 xylenol | 0.2 |
| Phenol | 0.2 |
| Sodium hydroxide | 0.05 |
| Total | 0.85 |

The aqueous wax emulsion used in the above examples may be prepared as follows: 450 lbs. of carnauba wax No. 3, (North Country) was melted in a steam-jacketed kettle by heating. To the melted wax was added 100 lbs. of a higher fatty acid, such as oleic acid. A hot aqueous solution of 18 lbs. of sodium hydroxide in 230 lbs. of water was added to the mixture and stirred. In place of sodium hydroxide may be used another alkali, such as: triethanolamine, morpholine or amino-methylpropanol. Finally about 994 lbs. of hot water was added and stirred well to provide the wax emulsion.

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A liquid polish for shoes and leather comprising an alkaline aqueous dispersion of about 1 to 18% by weight of a thermoplastic homopolymeric polybutyl methacrylate resin and about 0.25 to 3.5% by weight of a protein selected from the class consisting of vegetable protein and casein.

2. A liquid polish for shoes and leather comprising an alkaline aqueous dispersion of about 1 to 18% by weight of a thermoplastic homopolymeric polybutyl methacrylate resin, about 0.25 to 3.5% by weight of a protein selected from the group consisting of vegetable protein and casein and up to 12% of a wax.

3. A liquid polish for shoes and leather comprising an alkaline aqueous dispersion of about 1 to 18% by weight of a thermoplastic homopolymeric polybutyl methacrylate resin, about 0.25 to 3.5% by weight of a protein selected from the group consisting of vegetable protein and casein and up to 12% by weight of a wax, said dispersion having a pH of about 7.5 to 10.5.

4. A liquid polish for shoes and leather comprising an alkaline aqueous dispersion of about 1 to 18% by weight of a thermoplastic homopolymeric polybutyl methacrylate resin, about 0.25 to 3.5% by weight of a vegetable protein and up to 12% by weight of a wax.

5. A liquid polish for shoes and leather which comprises an alkaline aqueous dispersion of about 1 to 18% by weight of a thermoplastic homopolymeric polybutyl methacrylate resin, about 0.25 to 3.0% of soya bean protein, up to about 12% of a wax and up to 1.5% of a coloring material.

6. The process for preparing a liquid polish for shoes and leather which comprises preparing an alkaline aqueous slurry of a protein selected from the group consisting of vegetable protein and casein and mixing therewith an aqueous emulsion of a thermoplastic homopolymeric polybutyl methacrylate resin, said components being mixed in such proportions that the final composition contains about 1 to 18% by weight of the resin and about 0.25 to 3.5% by weight of protein.

7. The process for preparing a liquid polish for shoes and leather which comprises preparing an alkaline aqueous slurry of a vegetable protein, mixing an aqueous emulsion of a thermoplastic homopolymeric polybutyl methacrylate resin with the slurry and adding water in such proportions that the finished composition contains about 1 to 18% by weight of the resin and 0.25 to 3.0% by weight of protein.

References Cited in the file of this patent

UNITED STATES PATENTS

| | | |
|---|---|---|
| 2,544,146 | Erickson | Mar. 6, 1951 |
| 2,544,691 | Kugler et al. | Mar. 13, 1951 |
| 2,565,962 | Goldstein | Aug. 28, 1951 |
| 2,566,716 | Boe et al. | Sept. 4, 1951 |
| 2,587,657 | Schulte et al. | Mar. 4, 1952 |
| 2,605,242 | Betts et al. | July 29, 1952 |
| 2,636,829 | Smith et al. | Apr. 28, 1953 |
| 2,686,764 | Geister et al. | Aug. 17, 1954 |